United States Patent

[11] 3,620,788

[72] Inventors Willy Mueller
    Riehen;
    Felix Steinlin, Reinach Basel-Land, both of Switzerland
[21] Appl. No. 771,355
[22] Filed Oct. 28, 1968
[45] Patented Nov. 16, 1971
[73] Assignee Ciba Limited
    Basel, Switzerland
[32] Priority Nov. 10, 1967
[33] Switzerland
[31] 15747/67, Sept. 20, 1968, 14079/68

[54] SPARINGLY SOLUBLE ORGANIC DYESTUFFS
    11 Claims, No Drawings
[52] U.S. Cl. .................................................. 106/288 Q,
    8/39, 8/41 A, 8/41 R, 106/165, 106/308 N,
    106/308 Q
[51] Int. Cl. .............................................................. C09c
[50] Field of Search ........................................ 106/308 N,
    308 O, 288 Q, 308 Q

[56] References Cited
UNITED STATES PATENTS

| | | | |
|---|---|---|---|
| 2,907,670 | 10/1959 | Katz et al. ..................... | 106/308 O |
| 3,094,499 | 6/1963 | Gassmann et al. ............. | 106/308 O X |
| 3,156,574 | 11/1964 | Gomm et al. .................. | 106/308 O X |
| 3,337,360 | 8/1967 | Schonbach et al. ............ | 106/308 N |
| 3,446,569 | 5/1969 | Braun et al. ................... | 106/308 O X |
| 3,462,390 | 8/1969 | Dunn ............................. | 106/308 N X |

FOREIGN PATENTS 696,591  9/1940  Germany ......................

Primary Examiner—Tobias E. Levow
Assistant Examiner—H. M. S. Sneed
Attorneys—Harry Goldsmith, Joseph G. Kolodny, Bryant W. Brennan and Edward J. Sites ABSTRACT: Spin-dyeing of viscose with solutions of organic pigments containing sulfonamido or phenyl sulfonamido groups.

SPARINGLY SOLUBLE ORGANIC DYESTUFFS

It is known that during the process of their manufacture shaped structures based on regenerated cellulose can be dyed transparent shades with organic dyestuffs. However, transparent dyeings obtained in this manner often display insufficient depth of shade. Accordingly, there is a constant demand by the manufacturers of fibers and films for dyestuffs that can be used like pigment preparations, produce brilliant dyeings which are satisfactory in use and enable deep shades to be produced.

A process has also been described according to which fat-soluble dyestuffs, dissolved in water-immiscible solvents for example benzene or chlorobenzene, are stirred into viscose as such or in combination with an emulsifier. The dyeings produced in this manner do not differ from a pigment dyeing insofar as their luster is concerned, but they are much less satisfactory in use.

The present invention provides a process for the manufacture of transparent colored shaped structures based on regenerated cellulose, which overcomes the disadvantages referred to above wherein a solution, which may be alkaline, of (a) an organic pigment free from complex-forming metals, which contains at least one group of the formula $-SO_2NHR$, where R represents a hydrogen atom or an aryl radical, in (b) a water-soluble emulsifier, which may contain up to 50 percent of water, and, if desired, (c) an organic polar solvent for the dyestuff, that is miscible with water in all proportions and which is inert towards viscose, is incorporated with a viscose composition which is then precipitated and shaped.

Chemically inert polar solvents suitable for use in the present invention are those solvents which (1) do not react with the alkaline constituents of the viscose or (2) do not disturb the equilibrium reaction between $CS_2$ and the cellulose alcoholate; as a rule, they are organic compounds that do not have pronounced acid characteristics and, for example, do not contain any free acid groups. The solvent has advantageously a dielectric constant of at least 6 and has basic or less acidic properties than ethanol.

According to one variant of the present process the water-soluble emulsifier (b) may at the same time be the solvent (c) miscible with water in all proportions.

In principle, all organic pigments that satisfy the definition given under (a) may be used in the present process. From the large number of dyestuffs, which are as such suitable, however, only a small selection can be used for technical purpose, since, of course, only those dyestuffs are of practical interest which have a wide range of fastness properties, for example fastness to light, wetting, bleeding and so forth.

The dyestuffs to be used according to this invention may be derived, on one hand, from the pigments belonging to the class of substances called "pigments in the narrower sense" in the Color Index, 2nd edition, volume 2, p. 2697, 1957, which are as such sparingly soluble or insoluble. The expression "-sparingly soluble or insoluble" corresponds to the above mentioned definition given in the Color Index, the "solubility" being that in water and the common solvents, as mentioned in p. 2,698 of the above-mentioned Color Index. On the other hand, the dyestuffs to be used may also be derived from the group of the vat dyes, the definition of which is also given in the Color Index, 2nd edition, volume 2, pp. 2,411–2,426. Vattable pigments are preferably used.

From the chemical standpoint the dyestuffs to be used in the present invention will primarily be azo pigments, for example monoazo or disazo pigments, anthraquinoid compounds for example the anthraquinone compounds proper and the polynuclear compounds of the anthraquinone series containing at least four fused-on rings, and dyestuffs of the indigo type. The polynuclear compounds will preferably contain on average more than one sulfonamide group of the type mentioned per molecule or even on average more than two sulfonamide groups.

Suitable pigments are especially those which contain a sulfonamide group of the formula $R-HN-O_2S-R$ in which R represents a hydrogen atom or an aryl group and the symbol R represents the residue of an azo dyestuff. Some of these pigments are already known and the new ones are accessible by customary methods, for example by condensation or the coupling of diazo compounds with coupling components, especially those of the acetoacetamide or hydroxynaphthoic acid arylide series.

Emulsifier components (b) suitable for use in the present process are water-soluble emulsifiers which are preferably cationic or especially nonionic. The nonionic emulsifiers may also be used in combination with anionic or cationic emulsifiers, provided, of course, that this does not disturb the reactions with the viscose. The amount of emulsifier to be used may be varied within wide limits, but it is advantageous to employ a ratio dyestuff: emulsifier of 1:2 to 1:50 by weight, and preferably a ratio from 1:4 to 1:10.

Important representatives of the specially preferred nonionic emulsifiers belong especially to the following types of compounds: (i) Ethers of polyhydroxy compounds for example polyoxyalkylated aliphatic alcohols, polyoxyalkylated polyols, polyoxyalkylated mercaptans and aliphatic amines, polyoxyalkylated alkylphenols and -naphthols, polyoxyalkylated alkylarylmercaptans and alkylarylamines. (ii) Fatty acid esters of ethylene and polyethylene glycols, and of propylene and butylene glycol, of glycerol or of polyglycerols and of pentaerythritol, as well as of sugar alcohols for example sorbitol, sorbitans and saccharose. (iii) N-Hydroxyalkyl-carbonamides, polyoxyalkylated carbonamides and sulfonamides.

As advantageous emulsifiers in this group the following may be mentioned: Adducts of 8 mols of ethylene oxide with 1 mol of p-tertiary octylphenol, 15 or 6 mols of ethylene oxide with castor oil, 20 mols of ethylene oxide with the alcohol $C_{16}H_{33}OH$; ethylene oxide adducts with di-[$\alpha$-phenylethyl]-phenols, polyethylene oxide-tertiary dodecyl thioether, polyamine-polyglycol ether; adducts of 15 or 30 mols of ethylene oxide with 1 mol of the amine $C_{12}H_{25}NH_2$ or $C_{18}H_{37}NHB2$ and similar compounds.

Suitable cationic tensides are those in which the cation forms the larger part of the molecule. Particularly suitable are quaternated products derived from fat amines, the fat amine being an aliphatic amine containing an alkyl radical with about eight to 22 carbon atoms. The ammonium bases or their salts with inorganic or organic acids may also be used, for example a hydrohalic, acetic, sulfuric, lactic, formic, citric or tartaric acid. There may be used quaternary ammonium compounds of the general formula

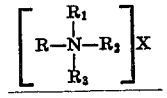

in which R represents a high-molecular weight organic residue containing at least eight carbon atoms, $R_1$, $R_2$ and $R_3$ each represents an alkyl, aralkyl or aryl radical, which may be substituted or together with the nitrogen atom form a heterocycle, and X represents an anion.

R may be an aliphatic, linear or branched hydrocarbon residue containing eight to 22 carbon atoms whose chain may contain one or several double bonds, hetero atoms, for example oxygen or if desired quaternated nitrogen atoms, or functional groups for example carboxylic acid groups. R may also be an aromatic, hydroaromatic or cycloaliphatic residue which may carry aliphatic side-chains. The alkyl, aralkyl or aryl radicals $R_1$, $R_2$ and $R_3$ may be identical or different and may contain substituents, for example halogen atoms, hydroxyalkyl or polyalkylene glycol ether groups. Together with the nitrogen atom they may form a heterocycle, for example a pyridine or morpholine ring. The anion X may represent either a hydroxyl group or the residue of an inorganic or organic acid; it may represent, for example, the residue of a hydrohalic acid for example hydrochloric or hydrobromic acid, or of another inorganic acid, for example sulfuric or phosphoric acid, or the residue of an organic carboxylic acid, for example acetic, formic, oxalic, lactic, tartaric, gluconic, citric or benzoic acid, or the residue of an organic sulfonic acid, for example of methane sulfonic or benzene sulfonic acid.

Suitable quaternary ammonium compounds are, for example, dodecyl-dimethyl benzylammonium chloride, oleyl-trimethyl ammonium chloride, distearyldimethyl ammonium chloride, lauryldimethyl-hydroxyethyl ammonium chloride, dodecyl-di-(hydroxyethyl)-methyl ammonium chloride, dodecyl-dimethylvinyl ammonium chloride, dodecyl-di-[(hydroxydiethoxy)-ethyl]-benzyl ammonium chloride, nonylphenyl-dimethylbenzyl ammonium chloride, oleyl-di-(hydroxyethyl)-ethyleneglycol ether ammonium chloride, oleyl-dimethyl-hydroxyethyl ammonium chloride, coconut fat alkyl-di-(triethyleneglycol ether)-benzyl ammonium chloride, coconut fat-alkyldimethylbenzyl ammonium chloride, coconut fat alkyldimethyl-$\gamma$-hydroxypropyl ammonium chloride, distearyldimethyl ammonium chloride, trioctylmethyl ammonium chloride, coconut fat alkyldimethyl-$\omega$-hydroxypropyl ammonium chloride and compounds of the formulas

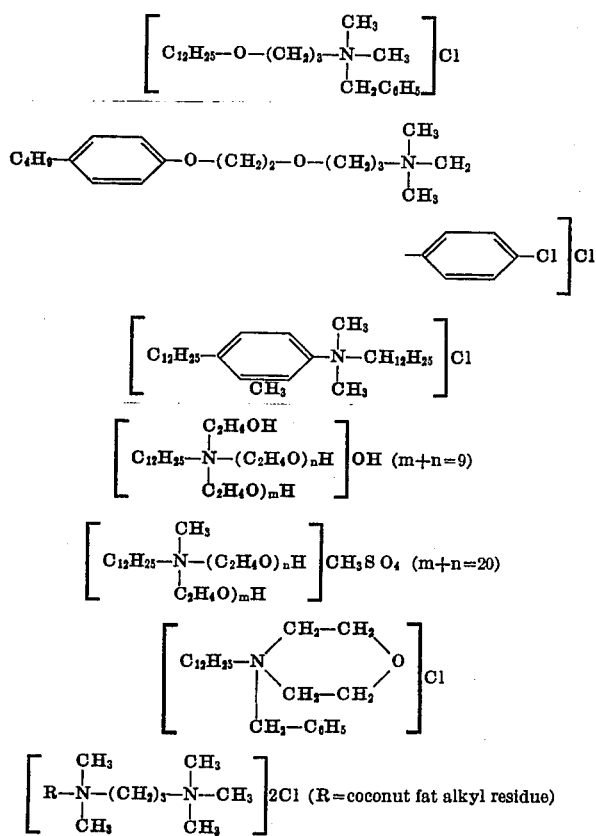

In many cases it is advantageous to use cationic compounds derived from heterocyclic nitrogenous bases for example pyridine or morpholine, for example dodecylmethylmorpholinium chloride, lauryl-pyridinium chloride and hexadecyl-N,N'-dimethyl benzimidazolinium sulfate.

Further suitable cationic surface-active compounds are quaternary phosphonium compounds of the general formula

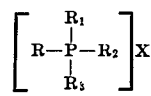

or tertiary sulfonium compounds of the general formula

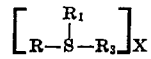

where R, $R_1$, $R_2$ and $R_3$ and X have the above meanings. Suitable quaternary phosphonium compounds are, for example, dodecyldimethylbenzyl phosphonium chloride, dodecyltrimethyl phosphonium chloride, dodecyl-dimethyl-hydroxyethyl phosphonium chloride, coconut fat alkyl-dimethylbenzyl phosphonium chloride and oleyl-dimethylbenzyl phosphonium chloride.

As examples of ternary sulfonium compounds the following may be mentioned: dodecyl-methyl-benzyl sulfonium chloride, dodecyl-dimethyl sulfonium chloride, dodecyl-pentahydroxyethylbenzyl sulfonium chloride, coconut fat alkylmethylbenzyl sulfonium chloride and oleylmethylbenzyl sulfonium chloride.

The dyestuff solutions containing an emulsifier, to be used in the present process, may be prepared in one of the following ways: (1) The dyestuff is dissolved in an active organic solvent which (a) completely dissolves the dyestuff (b) is miscible with water in any proportion and (c) is chemically inert towards viscose, preferably with addition of an alkali and of the emulsifier. (2) The dyestuff is dissolved in the nonionic emulsifier, preferably with addition of alkali, provided the nonionic emulsifier satisfies the requirements to be fulfilled by a solvent, in which case a further solvent may, but need not, be dispensed with.

The alkali may be added in form of an alcoholic solution of an alkali metal hydroxide or alcoholate, but the alkali, for example sodium hydroxide or potassium hydroxide, may be added as such in the form of a solution in the active solvent.

The term "polar solvents" comprises the solvents that boil above 100° C. which have recently gained favor because of their specially good properties as solvents for sparingly soluble or insoluble substances, for example linear high polymers, and because of their good reaction-promoting properties.

As polar solvents miscible with water in any proportion cyclic ethers may be used, for example dioxan, tetrahydrofuran, glycerolformal and glycolformal, as well as acetonitrile, tetrahydrofurfurylamine and pyridine, also certain high-boiling glycol derivatives for example diacetone alcohol and especially ethyleneglycol-monomethyl, -ethyl and -butyl and diethyleneglycol-monomethyl and -ethyl ether and more especially the group of active solvents that boil above 120° C. and are miscible with water, for example N,N-dimethylformamide, N,N-dimethylacetamide, bis-(dimethylamino)-methanephosphonate, tris-(dimethylamido)-phosphate, N-methylpyrrolidone, 1,5-dimethylpyrrolidone, N,N-dimethyl-methoxyacetamide, tetrahydromethylenesulphone (sulpholan), 3-methylsulpholan and dimethylsulphoxide.

Practically, any solvent boiling above 100° C., especially above 120° C., is suitable that is completely miscible with water, is free from ester groups sensitive to alkalies and whose molecule contains at most one alcoholic hydroxyl group. Especially suitable are solvents that have been proposed for dissolving linear, spinnable fully synthetic polymers and polycondensates, for example acrylonitrile polymers and copolymers. The preferred group of solvents further contains a large number of the above-mentioned dispersants that contain polyethyleneglycol residues. It goes without saying that solvent mixtures may be used provided they satisfy the requirements indicated above.

The requisite quantity of solvent depends on the nature of the dyestuff to be used. In general a quantity of solvent capable of completely dissolving the dyestuff will suffice.

The present process for the manufacture of transparent colored shaped structures can be applied to a variety of viscose compositions based on regenerated cellulose. Regenerated cellulose is any material accessible from natural cellulose by alkalization, sulphidation and shaping in a precipitating bath, the viscose obtained by sulphidation and dissolution being worked up, for example, in the form of tows, films, tapes, threads, bristles or preferably fibers or foils. Both long fibers and staple fibers may be manufactured.

The quantity of dyestuff to be used is governed by the desired dyeing effect and by the constitution of the dyestuff and may vary within wide limits. In general, a concentration from 0.01 to 3 percent, preferably from 0.1 to 1 percent by weight of dyestuff referred to cellulose will suffice. The complete dyestuff solution described above may be added directly to the desired quantity of viscose composition, and the process is generally performed at room temperature, though a slightly higher or lower temperature may be used as well. Alternatively, a concentrated stock solution of the dyestuff in the emulsifier and, if desired, the organic solvent may be prepared. Finally, the dyestuff solution may be added to the alkalized cellulose even before the start of the sulphidation.

The viscose may be shaped in the usual manner, for example through spinnerets in a precipitating bath (for example in a Mueller bath) and, if desired or required, in further baths.

The process of this invention lends itself extremely well to the manufacture of colored shaped structures based on regenerated cellulose having a high transparency and greater depth of color which, especially with filaments, results in an excellent brilliance. Conventional spin dyeings by means of very finely ground pigments have much less gloss than the dyeings obtained by the present process. It was just this matting effect associated with the known processes that prevented the wider use of such spin dyeing processes. Compared with the known bath dyeing processes the present process offers the considerable advantage that the known difficulties associated with the evenness of bath dyeings do not occur. Bath dyeing has an unfavorable effect upon the physical data of the fibers, for example tensile strength and elongation at rupture. Fibers dyed by the present process do not differ from the undyed material insofar as strength and stretch are concerned. In this respect the present process is also superior to the classic pigment dyeing method in which a reduction in strength of up to 10 percent, depending on the degree of pigmentation of the fiber, must be accepted. The present invention is also of special importance in the production of transparent foils colored deep shades, since with classic pigments transparent dyeings have hitherto been possible only in special cases with vat pigments which had to be reduced and reoxidized. Bath dyeing of foils involves considerable processing and fastness difficulties. Moreover, this type of dyeing can be only performed with dyestuffs having a very good affinity because the dyeing times are only a few seconds.

As will be clear from the foregoing the utilitarian properties of the dyeings can be materially varied by choosing a suitable dyestuff or, in this manner, fastness properties equivalent to those of pigment dyeings can be ensured.

Unless otherwise indicated, parts and percentages in the following examples are by weight.

EXAMPLE 1

1 Part of the dyestuff of the formula

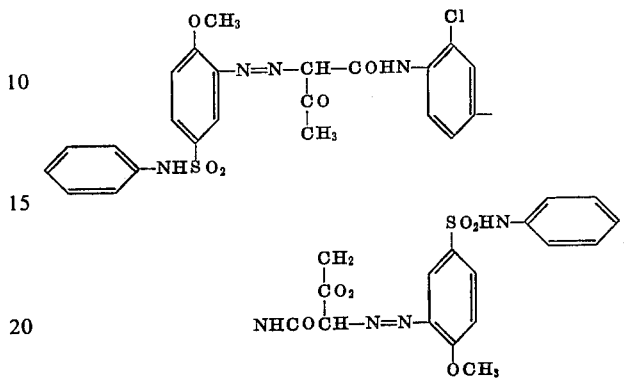

is dissolved by heating and stirring in 9 parts by volume of N-methylpyrrlidone with addition of 1 part by volume of 2N alcoholic potassium hydroxide solution. After cooling, 9 parts by weight of the condensation product of 2 mols of styrene, 1 mol of phenol and 10 mols of ethylene oxide are slowly stirred in so that the dyestuff remains in solution.

The dyestuff solution is stirred into 987 parts of ripe viscose ready for spinning, containing 75 parts of cellulose. Long fibers are then spun from the viscose with the aid of a precipitating bath containing sulfuric acid in the usual manner. The fibers are then washed in after-treating baths (for example water), desulphurized (for example with dilute aqueous solutions of sodium sulfide and sodium hydroxide solution), washed and brightened. The resulting yellow fibers have an excellent luster.

Further fibers dyed transparent shades may be obtained with the use of the pigments shown in column II of the following table; the shade of the colored fibers produced is shown in column III.

| No. | II | III |
|---|---|---|
| 4 | 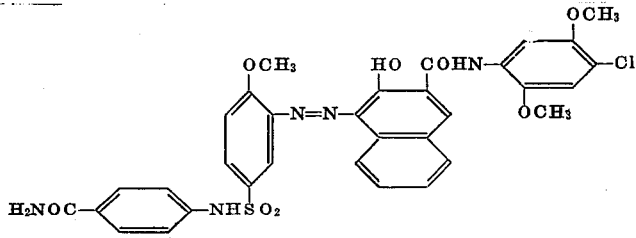 | Red. |
| 5 | 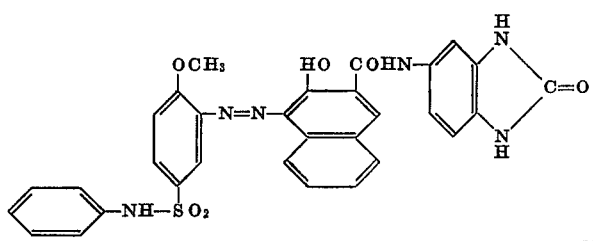 | Red. |
| 6 | 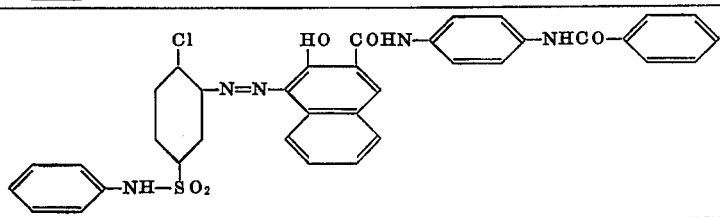 | Scarlet. |
| 7 | 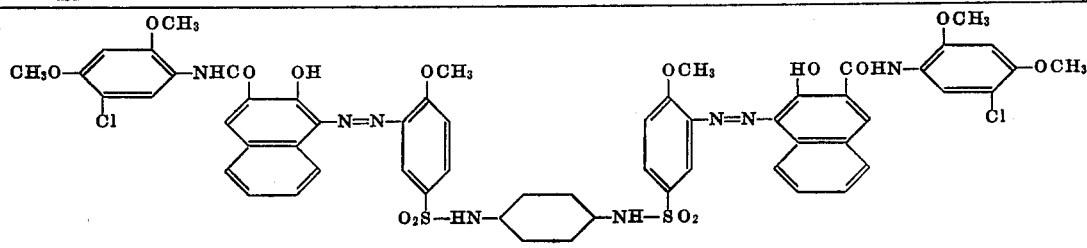 | Red. |

EXAMPLE 2

987 Parts of ripened, spinnable viscose, containing 75 parts of cellulose, are dyed with dyestuff solutions similar to those described in example 1, with the exception that the dyestuff solutions are prepared without addition of alkali. The undermentioned dyestuffs are used and all of them produce transparent red dyeings:

| No. | II | III |
|---|---|---|
| 1 | 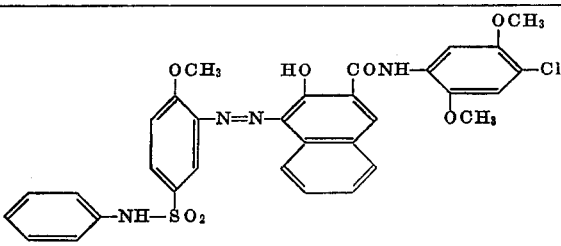 | Red. |
| 2 | 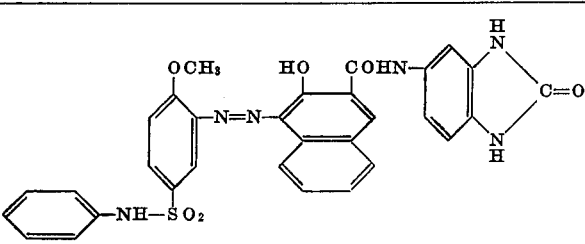 | Red. |
| 3 | 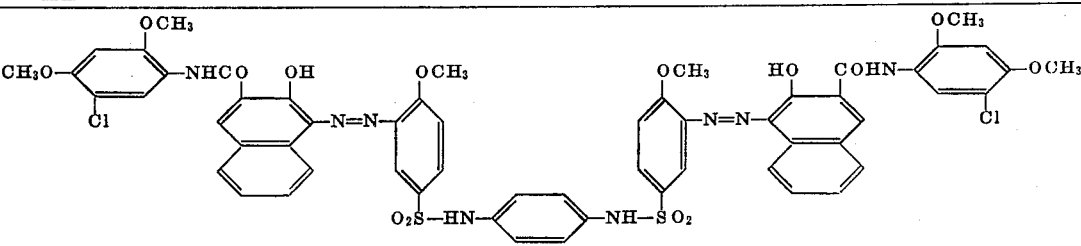 | Red |

EXAMPLE 3

1 Part of isodibenzanthrone-$(SO_2NH_2)_{1.75}$ is stirred while heating in 45 parts by volume of N-methylpyrrolidone with addition of 5 parts by volume of 2N alcoholic potassium hydroxide solution. After cooling, 45 parts of a condensation product of 2 mols of styrene, 1 mol of phenol and 10 mols of ethylene oxide are slowly stirred in. The resulting dyestuff solution still contains a small quantity of solid dyestuff particles.

The dyestuff solution is stirred into 987 parts of ripe, spinnable viscose containing 75 parts of cellulose. The viscose is then spun into long fibers in the usual manner with the aid of a precipitating bath containing sulfuric acid. The fibers are then washed in water, desulphurized with dilute aqueous solutions of sodium sulfide and sodium hydroxide, washed and brightened. The resulting violet fibers display an excellent luster which is not adversely affected by the possible presence of any undissolved dyestuff particles.

When the dyestuffs shown in column I are used for dyeing viscose, transparent dyeings of the shades shown in column II are obtained:

| | I | II |
|---|---|---|
| 1 | Dibenzanthrone-$(SO_2NH_2)_{1.5}$ | Violet. |
| 2 | Pyranthrone-$(SO_2NH_2)_{2.1}$ | Brown. |
| 3 | Acedianthrone-$(SO_2NH_2)_{1.3}$ | Do. |
| 4 | Dichloroisodibenzanthrone-$(SO_2NH_2)_{1.5}$ | Violet. |
| 5 | Isodibenzanthrone-$(SO_2NH-C_6H_5)_{1.6}$ | Do. |

EXAMPLE 4

1 Part of the dyestuff of the formula

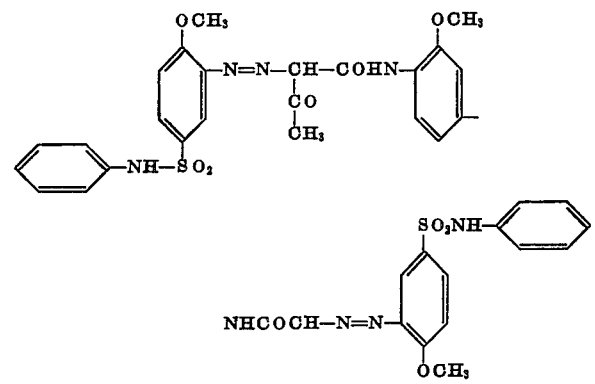

is dissolved with stirring and heating in 9 parts by volume of sulpholan with the addition of 1 part volume of 2N alcoholic potassium hydroxide solution. When this dyestuff solution is treated with the dispersing agent described in example 1, incorporated with viscose and spun as described in example 1, yellow fibers with an excellent luster are also obtained.

The identical result is obtained when dimethylformamide, dimethylsulphoxide or N-methylpyrrolidone is used instead of sulpholan.

EXAMPLE 5

45 Parts of the dyestuff of the formula

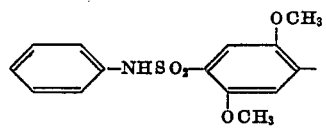

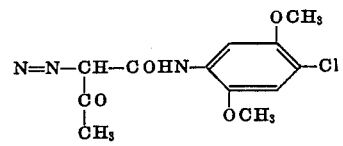

are stirred into 860 parts of a mixture of 235 parts of the ammonium base of the formula

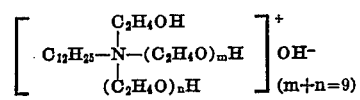

with 265 parts of polyglycol of average molecular weight 1000 and 500 parts of water. Then 95 parts of 33 percent aqueous sodium hydroxide solution are added and the whole heated to 70–80° C. while stirring, during which the dyestuff passes into solution and remains so even after cooling.

Alternatively, 860 parts of the above mixture together with the 95 parts of 33 percent sodium hydroxide solution is heated to 70°–80° C. and then the 45 parts of dyestuff are added. After stirring for a short time a complete solution is obtained.

22.2 Parts of this 4.5 percent pigment solution are stirred into 987 parts of ripened, spinnable viscose containing 75 parts of cellulose. When this dyed viscose is spun in the usual manner, it also produces yellow, transparent fibers having good light and wet fastness properties.

We claim:
1. A solution for spin dyeing viscose which comprises (a) an organic dyestuff free from complex-forming metals and characterized by the formula R–SO$_2$NHR where R is a hydrogen atom or an aryl radical and R is a residue of an azo dyestuff, (b) a nonionic water-soluble emulsifier present in a ratio of from 2 to 50 parts by weight emulsifier per part by weight of dyestuff and (c) an organic polar solvent which is miscible with water in all proportions, which is inert towards viscose and which boils above 100° C.

2. A dyestuff preparation as claimed in claim 1, wherein the ratio of emulsifier to dyestuff is from 4 to 10 parts of emulsifier per part of dyestuff.

3. A dyestuff preparation as claimed in claim 1, wherein the polar, organic solvent miscible with water in all proportions used is a solvent boiling above 100° C., whose molecule contains at most one hydroxyl group.

4. A dyestuff preparation as claimed in claim 1 that has been adjusted to an alkaline reaction.

5. A dyestuff preparation as claimed in claim 1, wherein the nonionic emulsifier acts as a solvent for the pigment, is miscible with water in all proportions and is inert towards viscose.

6. A dyestuff preparation as claimed in claim 1, wherein the emulsifier comprises a nonionic derivative of a polyglycol.

7. A dyestuff preparation as claimed in claim 1, wherein the pigment is a monoazo pigment.

8. A dyestuff preparation as claimed in claim 1, wherein the pigment is a disazo pigment.

9. A dyestuff preparation as claimed in claim 4, wherein the pigment contains more than one sulfonamide group in the molecule.

10. A dyestuff preparation as claimed in claim 3, wherein the solvent used boils above 120° C.

11. A dyestuff preparation as claimed in claim 10, wherein a solvent is used that is capable of dissolving unstretched acrylonitrile polymers and copolymers.

* * * * *

PO-1050
(5/69)

UNITED STATES PATENT OFFICE
CERTIFICATE OF CORRECTION

Patent No. 3,620,788     Dated November 16, 1971

Inventor(s) WILLY MUELLER ET AL

It is certified that error appears in the above-identified patent and that said Letters Patent are hereby corrected as shown below:

Column 1, line 75, delete "$R-HN-O_2S-R$", and substitute --- $R-HN-O_2S-R'$ ---.

Column 2, line 1, after "symbol", delete "R" and substitute --- R' ---.

Column 10, claim 1, line 35, delete "$R-SO_2NHR$" and substitute --- $R-SO_2NHR'$ ---.

Column 10, claim 1, line 36, after "and", delete "R" and substitute --- R' ---.

Signed and sealed this 13th day of June 1972.

(SEAL)
Attest:

EDWARD M. FLETCHER, JR.
Attesting Officer

ROBERT GOTTSCHALK
Commissioner of Patents